Oct. 13, 1964    E. O. MUELLER    3,152,558
TRACTION POWER UNIT SUSPENSION
Filed Aug. 23, 1962    3 Sheets-Sheet 1

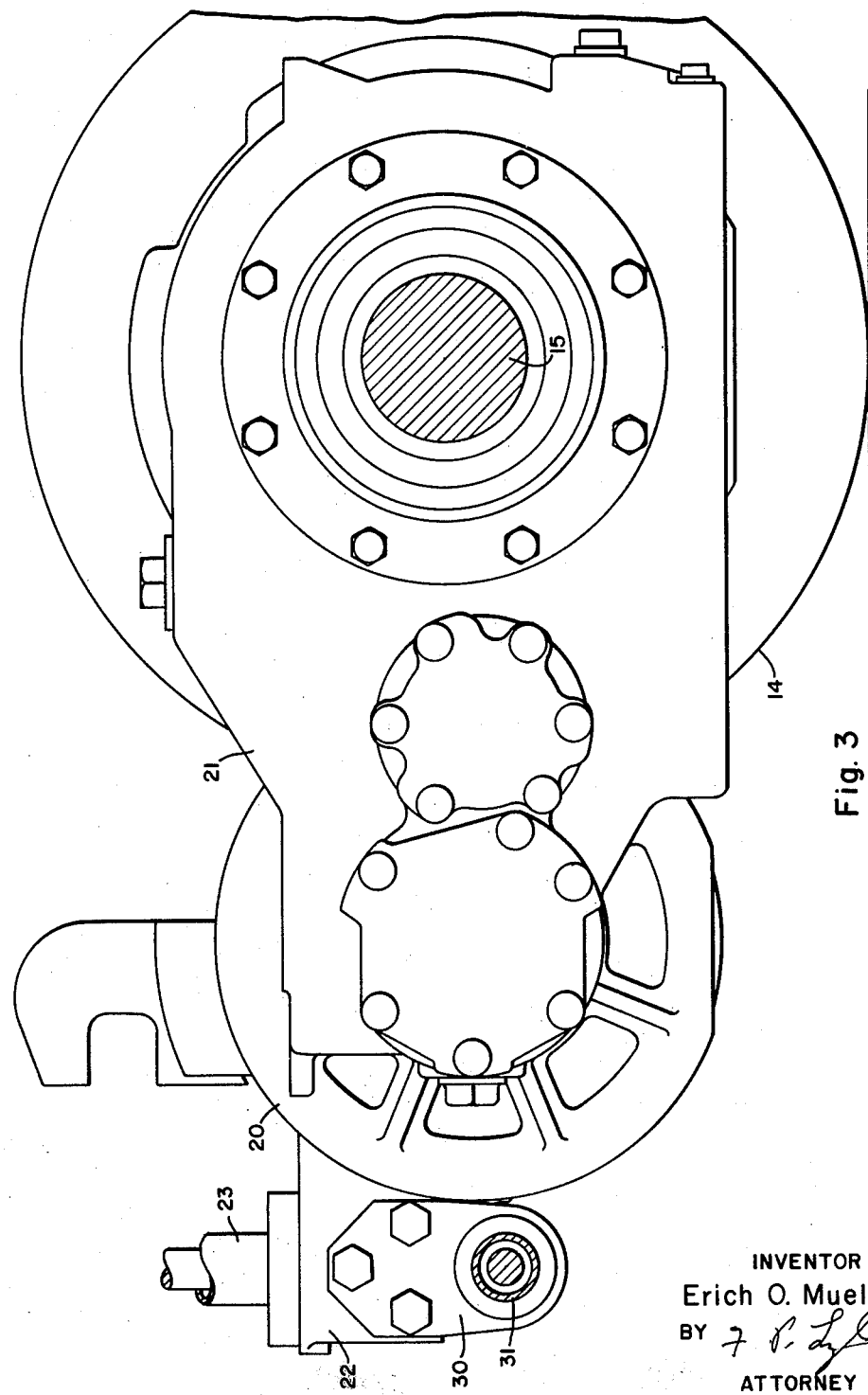

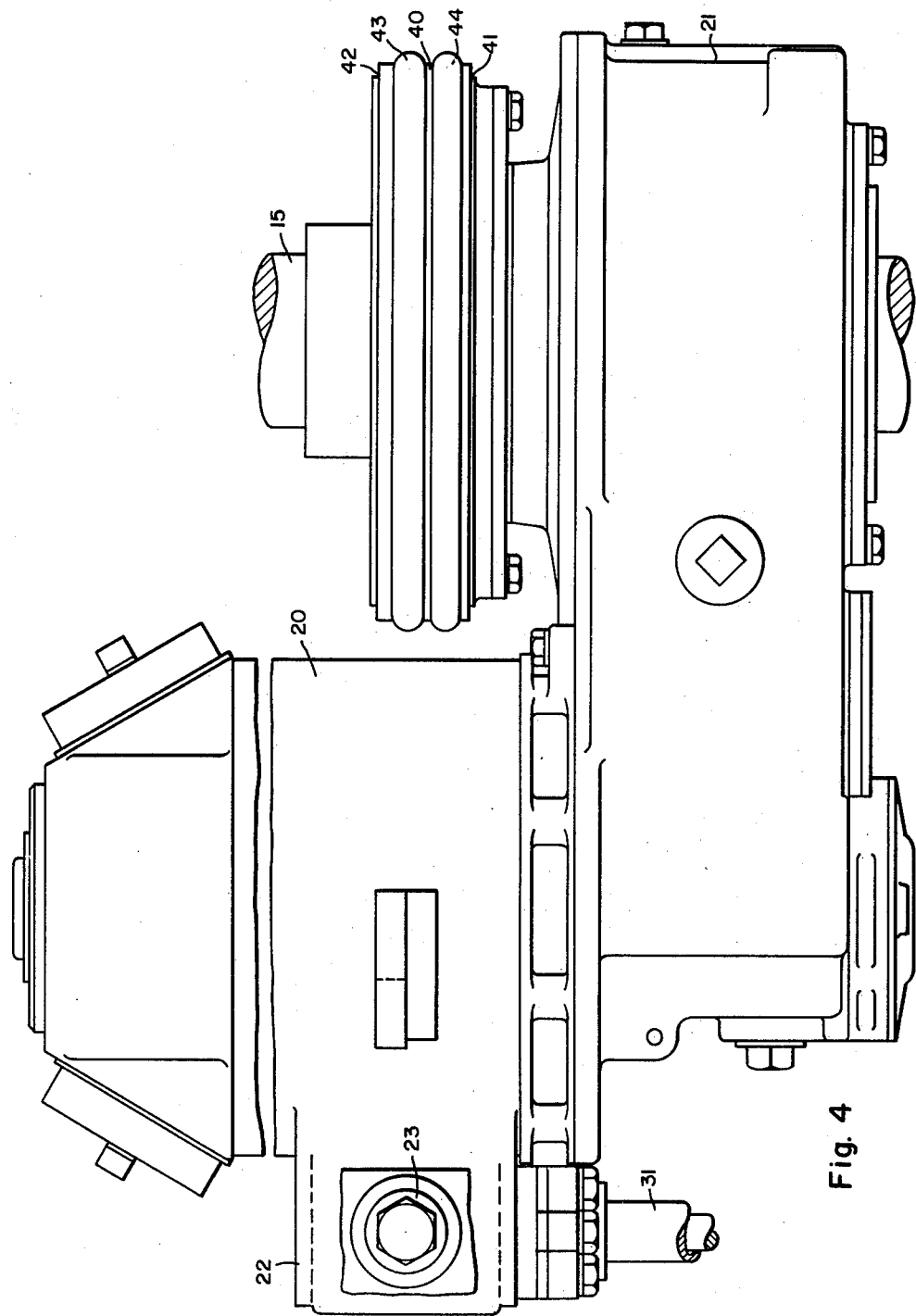

United States Patent Office 3,152,558
Patented Oct. 13, 1964

3,152,558
TRACTION POWER UNIT SUSPENSION
Erich Otto Mueller, Irwin, Pa., assignor to Westinghouse Electric Corporation, Pittsburgh, Pa., a corporation of Pennsylvania
Filed Aug. 23, 1962, Ser. No. 218,932
6 Claims. (Cl. 105—133)

The present invention relates to electric traction drives for railway vehicles or the like, and more particularly to the resilient mounting arrangements for supporting an electric motor and gearing in the traction truck frame.

High speed rapid transit vehicles for use in subways or the like employ truck mounted electric motors of relatively high power and speed for their size. In order to assure a maximum of reliability, it is desirable to resiliently support the motor and gear case from both the truck frame and the associated wheel and axle. It is also desirable to provide a parallel drive arrangement for the traction motor and the driven wheel axle in order to minimize the complexity of the drive gearing. It is believed that a parallel gear drive is the most efficient and reliable type of drive for very high speed and power requirements. However, most of the conventional truck mounted, parallel geared drive arrangements have provided that one or more of the motor or gear case supports be directly journalled on the driven axle, thus enabling undesirable axle shocks to be transmitted to the electric motor and drive apparatus.

It is a principal object of the present invention to provide an improved motor and drive support arrangement for parallel motor and axle electric traction trucks that will resiliently support the electric motor and drive assembly from both the truck frame and the wheel axle.

Another important object of the invention is to provide an improved resilient supporting arrangement for a parallel drive electric traction truck in which the resilient supports are uniquely positioned to balance vertical weight forces, gear torque reaction forces, and to resist side thrust forces.

In accordance with the invention, the electric motor and gear case are rigidly connected together in an assembly such that the final drive gear axis is generally parallel to the electric motor shaft. A resilient quill drive member is connected between the wheel axle of the traction truck and the gear case and final drive gear in a manner to resiliently support the gear case and motor assembly at two points about the wheel axle generally in alignment with a line perpendicular to the axle and passing through the center of gravity of the motor and gear case assembly which is also parallel to the plane of the drive gears. In addition, a resilient support is provided to suspend the electric motor from the truck frame at a point remote from the wheel axle but in alignment with said line passing through the center of gravity of the motor end gear case assembly. Also, in accordance with the invention, a resilient link is provided to interconnect the electric motor at the remote point with a side member of the truck frame in a manner to resist side thrust on the motor and gear case assembly.

Further objects, features and attending advantages of the invention will be apparent with reference to the following specification and drawings, in which:

FIG. 3 is a fragmentary side elevational view of the electric motor and gear case arrangement of the invention; and FIG. 4 is an enlarged fragmentary plan view of only the motor and gear case showing the details of the resilient quill support for supporting the gear case on the axle.

Figure 1:
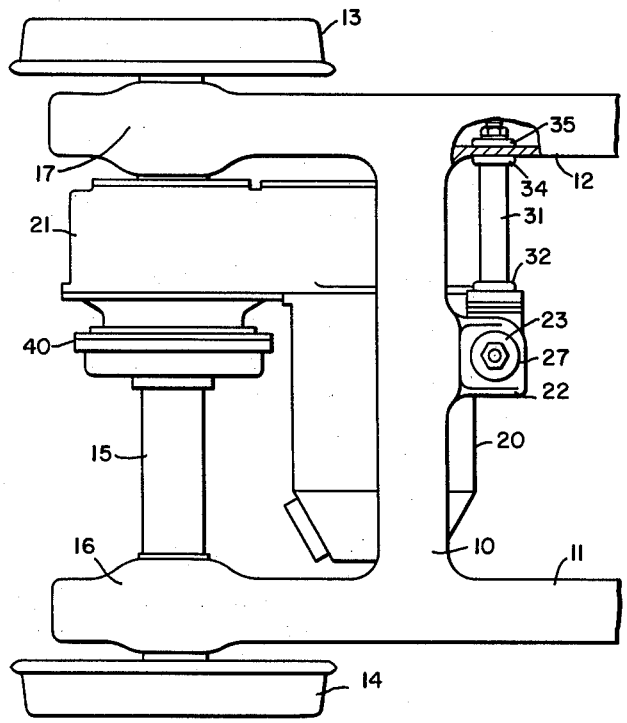
FIGURE 1 is a fragmentary plan view of an electric traction truck showing one wheel and axle together with the electric motor and drive arrangement of the invention.

Referring now to FIG. 1 of the drawing, there is shown a portion of an electric traction truck having an inside journalled frame arrangement and including the top cross member 10 and side members 11 and 12. Car wheels 13 and 14 are secured to the axle 15 which is journalled at 16 and 17 on so-called inside bearing pedestal supports of the truck frame. It should be understood that the motor and gearing support arrangements of the invention are not limited to use with an inside bearing truck, as shown, but may also be used with other forms of electric traction trucks including the outside bearing type of truck frame.

Figure 2:
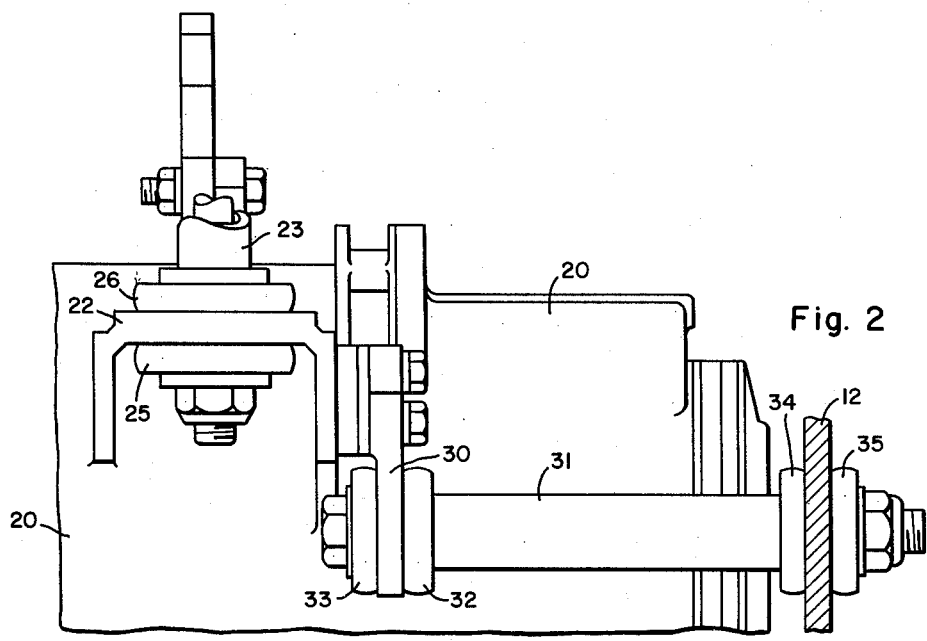
FIG. 2 is a fragmentary end elevational view of the electric motor assembly to show the vertical and horizontal support links of the invention.

The electric drive arrangement includes the electric motor 20 and gear case 21 which are bolted together to provide a rigid unitary structure for both the gear case and electric motor. As most clearly shown by FIGS. 1 to 3 of the drawings, the electric motor 20 is provided with a bracket 22 which is located at a point remote from the truck axle 15 but generally in alignment with a line perpendicular to the axle passing through the center of gravity of the unitary structure including the electric motor 20 and gear case 21. A vertical supporting link 23 is resiliently connected through the shock mountings 25 and 26 to the electric motor bracket 22, and is similarly connected through shock mounts, such as shown at 27, to the upper cross member 10 of the truck frame. Thus, the electric motor and gear case assembly are suspended at one end from the truck frame cross member 10 with the rotor or armature axis of the motor generally parallel to the axle.

In addition, the bracket 22 of the electric motor is provided with a support 30 to which is resiliently connected the horizontal support link 31 through the shock absorbing cushions 32 and 33. The other end of the horizontal support member 31 is connected through resilient cushions 34 and 35 to the side frame member 12 of the traction truck. Thus, the horizontal link 31 provides a resilient support to resist side thrust on the unitary electric motor and gear case assembly.

Referring now more particularly to FIGS. 1 and 4 of the drawings, it will be seen that the drive gear end of the gear case 21 is resiliently supported on the truck axle 15 by means of the resilient quill drive arrangement including a driven flange 40 secured to the axle 15, driving flanges 41 and 42 and resilient drive cushions 43 and 44. The details of the resilient quill driving and supporting arrangement are not shown since they may take various forms well known to those skilled in the art and are not essential to an understanding of the present invention. Reference may be made to my application Serial No. 219,631, filed August 27, 1962, assigned to the same assignee as the subject application and now abandoned, for the details of one form of resilient quill driving arrangement that could be used herein. Also, reference may be made to the disclosures of Patents 2,277,835 and 2,067,109 for other arrangements of flexible quill drive that could be used herein. Suffice it to say that the resilient quill supporting arrangement functions to transmit driving torque from the driven gear within the gear case 21 to the truck axle 15 and also functions to resiliently support the gear case 21 at spaced points about the axle 15. Obviously, the arrangement of the resilient quill may be reversed so that flanges 41 and 42 are connected to the axle 15 and flange 40 is connected to the driven gear within the gear case 21.

In either case it will be noted that the points of resilient support for the gear casing 21 are positioned about the axle 15 and are generally in alignment with a line perpendicular to the axle and passing through the center of gravity for the entire assembly of electric motor 20 and gear case 21. Furthermore, it will be noted that the driving and driven flanges 40-42 are essentially parallel to the plane of the gearing including the drive and driven gears within the gear case 21 (not shown). Thus, the unitary assembly of electric motor 20 and gear case 21 is resiliently supported on the truck axle 15 and the truck frame in a manner to balance vertical weight forces, gear torque reaction forces, and to resist side thrust forces. More specifically, the positioning of the planes of the driving and driven flanges 40-42 of the resilient quill generally in alignment with said line perpendicular to the axle and passing through the center of gravity of the motor and gear case assembly assures that the vertical weight forces on the resilient quill support will be balanced. Furthermore, the positioning of the drive and driven flanges 40-42 of the resilient quill generally in a plane parallel to the plane surfaces of the gears in the gear case 21 functions to provide the most effective balancing of gear torque reaction forces on the resilient supports. In addition, the provision of the side thrust resilient link member 31 connected at the point most remote from the truck axle 15 to the electric motor housing 20 relieves the resilient quill drive arrangement from any side thrusting forces through the electric motor 20 and gear case 21.

Various modifications will occur to those skilled in the art within the spirit of the invention. For example, as previously mentioned the supporting arrangement of the invention is not limited to use with an inside journalled truck frame as described but may be used with other types of electric traction trucks. Nor is the invention limited to a specific form of gear drive within the gear casing 21, since various detailed arrangements of gears will occur to those skilled in the art.

I claim as my invention:

1. An electric traction drive arrangement comprising a truck frame, a wheels and axle assembly journalled to said frame, an electric motor having a rotatable armature shaft, a gear case rigidly secured to said motor, means to resiliently support said case on said axle with the axis of said motor shaft generally parallel to the axle, means to resiliently suspend said motor from said truck frame at a point remote from said axle, and means resiliently connecting said motor at said point remote from said axle to a side member of said truck frame to resist side thrust on said motor and gear case.

2. In an electric traction truck of the type having a truck frame with a wheels and axle assembly journalled in truck side frame members, an electric drive and resilient support means therefor comprising an electric motor having a rotatable armature shaft, a gear case rigidly connected to said motor, resilient support means adapted to support one end of said gear case on the truck axle with the axis of said motor shaft generally parallel to the axle, resilient support means adapted to suspend said electric motor from said truck frame at a point remote from said gear case and axle, and resilient means adapted to interconnect said motor at the remote point and a side member of the truck frame to resist side movement of said electric drive.

3. An electric traction drive arrangement comprising a truck frame, a wheels and axle assembly journalled to said frame, an electric motor having a rotatable armature shaft, a gear case rigidly secured to said motor and having gearing including a final drive gear on an axis generally parallel to the armature shaft axis of said electric motor, means to resiliently support said case on said axle with the axis of said drive gear concentric with the axis of said axle, means to resiliently suspend said motor from said truck frame at a point remote from said axle, and means resiliently connecting said motor at said point remote from said axle to a side member of said truck frame to resist side thrust on said motor and gear case.

4. An electric traction drive arrangement comprising a truck frame, a wheels and axle assembly journalled to said frame, an electric motor having a rotatable armature shaft, a gear case rigidly secured to said motor and having gearing including a final drive gear having an axis generally parallel to the armature shaft axis of said electric motor, resilient quill drive means to resiliently support said case on said axle with the axis of said drive gear concentric with the axis of said axle, means to resiliently suspend said motor from said truck frame at a point remote from said axle, and means resiliently connecting said motor at said point remote from said axle to a side member of said truck frame to resist side thrust on said motor and gear case.

5. In an electric traction truck of the type having a truck frame with a wheels and axle assembly journalled in truck side frame members, an electric drive and resilient support means therefor comprising an electric motor having a rotatable armature shaft, a gear case rigidly connected to said motor and containing gearing including a final drive gear having an axis generally parallel to the armature axis of said motor, resilient quill drive means to resiliently support said case on said axle with the axis of said drive gear concentric with the axis of said axle, a bracket on said motor at a point remote from said gear case and axle, resilient link means adapted to interconnect said bracket and the truck frame to suspend said motor from the truck frame, and resilient link means adapted to interconnect said bracket and a side frame member of the truck to resist side thrust on said motor and case.

6. In an electric traction truck of the type having a truck frame with a wheels and axle assembly journalled in truck side frame members, an electric drive and resilient support means therefor comprising an electric motor having a rotatable armature shaft, a gear case rigidly connected to said motor and containing gearing including a final drive gear having an axis generally parallel to the armature shaft axis of said motor, resilient quill drive means to resiliently support said case on said axle with the axis of said drive gear concentric with the axis of said axle, said resilient drive means being generally in alignment with a line perpendicular to said axle and passing through the center of gravity of said motor and rigidly connected gear case, a bracket on said motor at a point remote from said gear case and axle and also in general alignment with said line perpendicular to the axle and passing through the center of gravity of said motor and gear case and said resilient drive means, resilient link means adapted to interconnect said bracket and the truck frame to suspend said motor from the truck frame, and resilient link means adapted to interconnect said bracket and a side frame member of the truck to resist side thrust on said motor and case.

References Cited in the file of this patent

UNITED STATES PATENTS

| | | |
|---|---|---|
| 1,813,140 | Bethel | July 7, 1931 |
| 2,042,177 | Howard | May 26, 1936 |
| 2,371,621 | Harwick | Mar. 20, 1945 |
| 2,664,003 | Nixon | Dec. 29, 1953 |